Oct. 25, 1927.
F. C. WESTMAN
1,647,066
RESURFACING DEVICE
Filed June 12, 1926
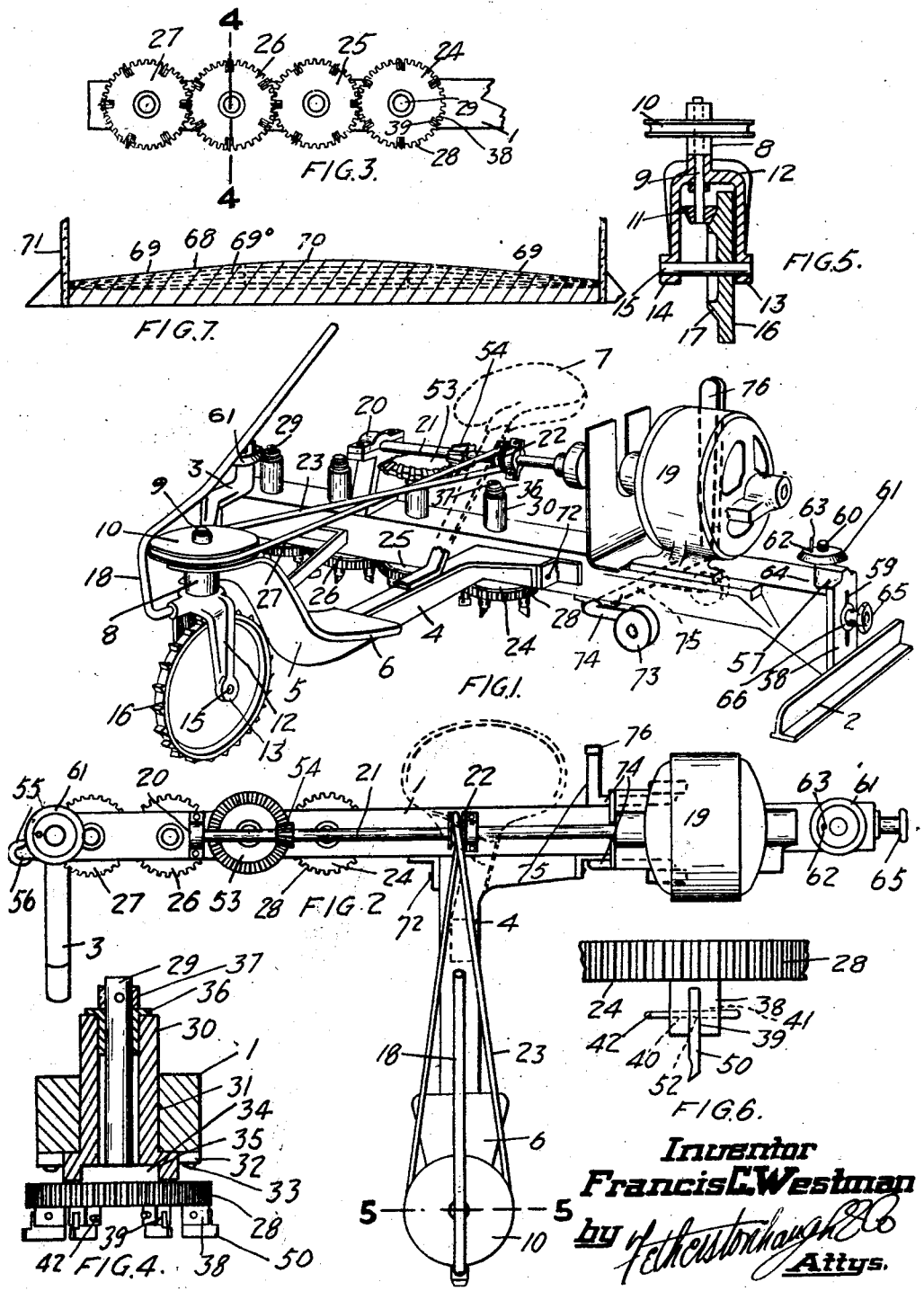
Inventor
Francis C. Westman
by Fetherstonhaugh & Co
Attys.

Patented Oct. 25, 1927.

1,647,066

UNITED STATES PATENT OFFICE.

FRANCIS CAMERON WESTMAN, OF TORONTO, ONTARIO, CANADA.

RESURFACING DEVICE.

Application filed June 12, 1926. Serial No. 115,645.

My invention relates to improvements in resurfacing devices particularly adaptable to the resurfacing of ice rinks, and the object of the invention is to devise a device by which the ice may be quickly given a smooth and level surface without performing after each day's use the slow operation of spraying and freezing commonly practiced, and it consists essentially of the arrangement and construction of parts as hereinafter more particularly explained.

Fig. 1 is a perspective view of my device.

Fig. 2 is a plan view.

Fig. 3 is an inverted plan view of a portion of my device showing the resurfacing cutters inverted.

Fig. 4 is a sectional view on line 4—4 Figure 3.

Fig. 5 is a sectional view on line 5—5 Figure 2.

Fig. 6 is a detail view showing one of the cutter knives and the means for securing the same to the rotating cutter head.

Fig. 7 is a sectional view through a rink showing the ice surface bowed and by dotted lines the course of the cutters of my resurfacing device when performing the operation.

In the drawings like characters of reference indicate corresponding parts in each figure.

1 indicates a beam forming the main body of my device supported upon runners 2 and 3 at each end thereof, which runners are adjustable vertically as will hereinafter be described.

4 is a tongue extending forward from the beam 1 intermediate of its length and curved upward into goose neck form as indicated at 5 and forming a foot plate 6 upon which the feet of the operator rests when sitting upon the driving seat 7. 8 is a vertical bearing formed at the upper end of the goose neck 5. 9 is a shaft journalled in a bearing 8. 10 is a pulley which is secured to the upper end of the shaft 9. 11 is a bevelled pinion secured at the lower end of the shaft 9. 12 is a forked bracket swung upon the shaft 9 and suitably held from vertical movement. 13 and 14 are bearings formed at the lower end of the fork arms 12. 15 is a shaft journalled in the bearings 13 and 14 and upon which is mounted a peripherally toothed tractor wheel 16 provided with a bevelled gear 17 formed integral therewith and meshing with the bevelled pinion 11. 18 is a steering handle by which the fork 12 is swung around the shaft 9 so as to guide the tractor wheel 16 in the required direction. 19 is a motor mounted upon the beam 1 in proximity to one end thereof and 20 is a bearing standard secured to the beam 1 in proximity to the opposite end thereof. 21 is a motor shaft which is journalled in the bearing standard 20 and upon which is secured a small pulley 22 connected to the pulley 10 by a rope or other suitable flexible drive 23.

By this means the tractor wheel 16 may be guided in the required direction. 24 and 25, 26 and 27 are a series of cutter heads provided with geared peripheries 28 intermeshing one with the other so as to rotate in unison. The heads 24, 25, 26 and 27 are each provided with a vertical shaft 29 mounted in vertical bearings 30 extending through orifices 31 formed in the beam 1 and secured therein by means of lugs 32 through which bolts 33 extends into the beam 1. 34 is a bearing of antifriction type held within a recess 35 formed in the lower end of the bearing 30. 36 is a bronze sleeve forming a bushing through which the upper end of the shaft 29 extends, and 37 is a securing collar which is pinned or otherwise suitably secured to the shaft 29 to bear against the upper end of the sleeve 6.

By this means the cutter heads are firmly secured in position so as to rotate freely.

38 are lugs depending from the cutter heads and provided with cross slots 39 extending radially of the head and transverse orifices 40 and 41 through which a tapered pin 42 extends. 50 are cutters provided with cutting edges 51 engaging the surface of the ice.

The cutters 50 are provided with orifices 52 through which the tapered pin 42 is driven thereby drawing the cutters tight up against the base of the groove 39.

One of the shafts 29 is provided with an upward extension to which a bevelled gear 53 is secured.

54 is a bevelled pinion secured to the motor shaft 21 and meshing with the bevelled gear 53.

By this means the cutter heads 24, 25, 26 and 27 are driven continuously from the motor causing the cutters to pare off the ice as the heads rotate, such cutters being arranged alternately, that is, the cutters of one head being located in an intermediate overlapping position in relation to the cutters of the next adjacent head so as to cut a continuous smooth surface.

55 is a roller mounted in a bracket 56 carried at the outer end of the beam 1 so as to contact with the cushion wall of the rink so that the outside end of the machine has sliding contact with such wall preventing any danger of damage.

In order to adjust the runners 2 and 3 vertically I provide a bracket 57 provided with a depending plate like portion 58 bearing against the end of the beam 1 and provided with a vertical slot 59.

60 is a threaded stem extending through an internally threaded orifice in the bracket 57 and to which is secured a hand wheel 61 provided with an orifice 62 through which a pin 63 extends freely into an orifice 64 formed in the beam 1. 65 is a securing screw which shoulders against a washer 66 bearing against the outer face of the bracket portion 58 at each side of the slot 59. By loosening the securing screw 65 the bracket 58 is released and by then turning the hand wheel 61 a runner 2 or 3 may be so adjusted as to regulate the height of the cutters 50 from the surface to be treated. It will be understood that one complete rotation of the hand wheel 61 will adjust the machine so as to carry the cutters a predetermined fraction of a part of an inch to or from the surface to be cut. This adjustment may be definitely regulated by the pin 63 which drops into the hole 64 when one complete rotation of the hand wheel 61 has been made.

In Figure 7 I have shown a sectional view through a cushion rink showing the surface of the ice bowed in an exaggerated form to illustrate the operation of my device. In this figure 68 indicates the bowed surface of the ice and 69 and 70 the swath cut by the machine during resurfacing. 71 indicates the cushion wall of the rink.

Although I have shown only one swath 69 it will, of course, be understood that several swaths would be cut before reaching the central swath 70.

In starting to resurface the rink the outer portion is first surfaced. The outer shoe or runner 3 would when starting the operation of the machine be on a lower level than the runner 2 which as illustrated in Figure 7 would be on the top of the ice surface at 68. It is therefore necessary to adjust the inner shoe 2 upward sufficient to carry the cutters into position so that they will cut upon the dotted line 69. When the rink has been completely circled by the machine the hand wheel 61 is again released by raising the pin 63 and rotated after loosening the securing screw 65 so as to lower the shoe 2 to permit of another layer of ice being cut as indicated by the dotted line 69°, this operation being repeated until the beam 1 and the cutters thereof have been brought to a true horizontal position.

It will of course be understood that when cutting the centre portion 68 that both shoes will be on the same level and are therefore simultaneously adjusted after each cut so as to lower the machine horizontally to cut the portion 68 layer by layer.

In order that the device may be readily transported and passed through narrow door-ways the tongue 4 may be pivotally mounted upon the main body 1 as indicated at 72 so that it may be swung up over such body and carrier wheels 73 provided mounted upon the arms 74 of a crank shaft 75 having a lever handle 76 formed integral therewith. By swinging the lever from the position shown to a horizontal position the wheels 73 are carried into engagement with the ground so as to raise the device off the runners 2 and 3 and allow of the device being pushed through a narrow door opening.

From this description it will be seen that I have devised a very simple device whereby surfaces such as ice rinks may be quickly levelled so as to be absolutely true without the slow and tedious process of building up the ice by spraying and freezing as is commonly now done after each performance.

Although I have described my device as applied to the surfacing of ice rinks it will of course be understood that it may be applied to the resurfacing of hardwood floors or to the levelling of any other surface formed of a material which may be cut away in the manner described.

What I claim as my invention is:

1. A resurfacing device comprising a tractor carriage, a motor mounted thereon, a tongue extending forward therefrom, a tractor wheel carried by the tongue, means for steering the tractor wheel, means for driving the tractor wheel from the motor, means for independently adjusting the sides of the carriage vertically, and cutting means carried by the carriage to engage the surface to be levelled to cut it away layer by layer.

2. A resurfacing device comprising a beam like carriage body, a runner located at each end of the body and extending transversely thereof, means for independently adjusting the runners vertically, steerable tractor means incorporated in the device, means carried by the carriage body for driving the tractor means, and surface cutters carried beneath the body and adapted to engage the surface to be levelled to cut it away layer by layer.

3. A resurfacing device comprising a tractor body, a tractor wheel mounted upon the tractor in contact with the supporting surface, a runner at each side of the tractor carriage and set parallel with the line of travel, a plurality of cutter heads revolvably mounted beneath the carriage, and connected together to revolve in unison, a motor mounted upon the carriage, a motor shaft therefor, means for revolving the cutters from the motor shaft, and means for driving the tractor wheel from the motor shaft.

4. A resurfacing device comprising a tractor body, a motor mounted upon the tractor body, a motor shaft therefor, runners at each side of the tractor body set parallel with the line of travel, a plurality of cutter heads revolvably mounted beneath the tractor, cutters depending therefrom to engage the surface to be levelled, means for revolving the cutters from the motor shaft, a pulley mounted upon the motor shaft, a tongue extending forwardly from the tractor body having a goose neck forward end terminating in a vertical bearing, a shaft journalled in the bearing, a fork depending from the shaft, a tractor wheel journalled in the fork, a tractor wheel shaft extending through the forked bearing, a gear pinion mounted upon the lower end of the shaft, a pulley mounted upon the upper end of the shaft, a flexible drive between the last mentioned pulley and the motor shaft pulley, and a gear carried by the tractor wheel in engagement with the aforesaid gear pinion.

5. A resurfacing device comprising a tractor body, a motor mounted upon the tractor body, a motor shaft therefor, runners at each side of the tractor body set parallel with the line of travel, a plurality of cutter heads revolvably mounted beneath the tractor, cutters depending therefrom to engage the surface to be levelled, means for revolving the cutters from the motor shaft, a pulley mounted upon the motor shaft, a tongue extending forwardly from the tractor body having a goose neck forward end terminating in a vertical bearing, a shaft journalled in the bearing, a fork depending from the shaft, a tractor wheel journalled in the fork, a tractor wheel shaft extending through the forked bearing, a gear pinion mounted upon the lower end of the shaft, a pulley mounted upon the upper end of the shaft, a flexible drive between the last mentioned pulley and the motor shaft pulley, and a gear carried by the tractor wheel in engagement with the aforesaid gear pinion, a steering handle extending forwardly from the fork and upward over the tractor drive pulley and rearward towards the tractor body.

6. A resurfacing device comprising a tractor carriage a motor mounted thereon, a tongue hingedly connected thereto, a tractor wheel carried by the tongue, means for steering the tractor wheel, means for driving the tractor wheel from the motor, means for independently adjusting the sides of the carriage vertically, cutting means carried by the carriage to engage the surface to be levelled to cut it away layer by layer, carrier wheels, and means for forcing the carrier wheels against the ground to raise the carriage therefrom.

FRANCIS CAMERON WESTMAN.